United States Patent
Chino et al.

(10) Patent No.: US 11,297,220 B2
(45) Date of Patent: Apr. 5, 2022

(54) CONTROL APPARATUS, CONTROL METHOD, AND STORAGE MEDIUM

(71) Applicant: CANON KABUSHIKI KAISHA, Tokyo (JP)

(72) Inventors: Shunsuke Chino, Wako (JP); Ryo Kawasaki, Yokohama (JP); Natsuko Sato, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/937,024

(22) Filed: Jul. 23, 2020

(65) Prior Publication Data
US 2021/0067704 A1 Mar. 4, 2021

(51) Int. Cl.
| | |
|---|---|
| *H04N 5/232* | (2006.01) |
| *G03B 5/06* | (2021.01) |
| *G03B 5/08* | (2021.01) |
| *G03B 13/34* | (2021.01) |
| *H04N 5/225* | (2006.01) |

(52) U.S. Cl.
CPC ... *H04N 5/232122* (2018.08); *H04N 5/23299* (2018.08); *H04N 5/232123* (2018.08)

(58) Field of Classification Search
CPC ......... H04N 5/23299; H04N 5/232123; G03B 2205/0038
See application file for complete search history.

(56) References Cited

U.S. PATENT DOCUMENTS

| | | |
|---|---|---|
| 6,359,650 B1 | 3/2002 | Murakami |
| 2002/0080242 A1 | 6/2002 | Takahashi et al. |
| 2007/0071429 A1* | 3/2007 | Woehler ............... H04N 5/2259 396/89 |
| 2016/0277668 A1* | 9/2016 | Yokozeki ......... H04N 5/232122 |
| 2017/0272658 A1 | 9/2017 | Ito |
| 2020/0137313 A1 | 4/2020 | Sato et al. |
| 2020/0191563 A1 | 6/2020 | Sato |
| 2020/0296296 A1 | 9/2020 | Chino et al. |

FOREIGN PATENT DOCUMENTS

JP  2010130633 A  6/2010

OTHER PUBLICATIONS

Extended European Search Report dated Jan. 18, 2021, for Corresponding European Patent Application No. 20188046.5.

* cited by examiner

*Primary Examiner* — Christopher K Peterson
(74) *Attorney, Agent, or Firm* — Carter, DeLuca & Farrell LLP

(57) ABSTRACT

A control apparatus includes a controlling unit configured to control tilt driving for tilting at least one of an image sensor and an imaging optical system relative to a plane orthogonal to an optical axis and focus driving for moving a focus lens in an optical axis direction, an acquiring unit configured to acquire focus levels in a first area and a second area in an image captured by an image pickup apparatus, a first determining unit configured to determine whether to perform the tilt driving or the focus driving, based on an in-focus level, and a second determining unit configured to determine a driving direction of the tilt driving or the focus driving based on the in-focus level.

17 Claims, 8 Drawing Sheets

| CONTROL | IN-FOCUS EVALUATION VALUE CHANGE | | STATUS | NEXT CONTROL |
|---|---|---|---|---|
| | OBJECT X | OBJECT Y | | |
| TILT DRIVING (+ DIRECTION) | INCREASE | INCREASE | TILT SHORTAGE | TILT DRIVING (+ DIRECTION) |
| | INCREASE | DECREASE | ON INFINITY SIDE | FOCUS DRIVING (TO SHORT DISTANCE SIDE) |
| | DECREASE | INCREASE | ON SHORT DISTANCE SIDE | FOCUS DRIVING (TO INFINITY SIDE) |
| | DECREASE | DECREASE | TILT EXCESS | TILT DRIVING (- DIRECTION) |
| | | | ※DRIVING IN OPPOSITE DIRECTIONS AND DECREASES ON BOTH SIDES: IN-FOCUS | STOP |
| TILT DRIVING (- DIRECTION) | INCREASE | INCREASE | TILT EXCESS | TILT DRIVING (- DIRECTION) |
| | INCREASE | DECREASE | ON SHORT DISTANCE SIDE | FOCUS DRIVING (TO INFINITY SIDE) |
| | DECREASE | INCREASE | ON INFINITY SIDE | FOCUS DRIVING (TO SHORT DISTANCE SIDE) |
| | DECREASE | DECREASE | TILT SHORTAGE | TILT DRIVING (+ DIRECTION) |
| | | | ※DRIVING IN OPPOSITE DIRECTIONS AND DECREASES ON BOTH SIDES: IN-FOCUS | STOP |
| FOCUS DRIVING (TO SHORT DISTANCE SIDE) | INCREASE | INCREASE | ON INFINITY SIDE | FOCUS DRIVING (TO SHORT DISTANCE SIDE) |
| | INCREASE | DECREASE | TILT SHORTAGE | TILT DRIVING (+ DIRECTION) |
| | DECREASE | INCREASE | TILT EXCESS | TILT DRIVING (- DIRECTION) |
| | DECREASE | DECREASE | ON SHORT DISTANCE SIDE | FOCUS DRIVING (TO INFINITY SIDE) |
| | | | ※DRIVING IN OPPOSITE DIRECTIONS AND DECREASES ON BOTH SIDES: IN-FOCUS | STOP |
| FOCUS DRIVING (TO INFINITY SIDE) | INCREASE | INCREASE | ON SHORT DISTANCE SIDE | FOCUS DRIVING (TO INFINITY SIDE) |
| | INCREASE | DECREASE | TILT EXCESS | TILT DRIVING (- DIRECTION) |
| | DECREASE | INCREASE | TILT SHORTAGE | TILT DRIVING (+ DIRECTION) |
| | DECREASE | DECREASE | ON INFINITY SIDE | FOCUS DRIVING (TO SHORT DISTANCE SIDE) |
| | | | ※DRIVING IN OPPOSITE DIRECTIONS AND DECREASES ON BOTH SIDES: IN-FOCUS | STOP |

FIG. 5

CONTROL APPARATUS, CONTROL METHOD, AND STORAGE MEDIUM

BACKGROUND OF THE INVENTION

Field of the Invention

The present invention relates to a control apparatus that controls a focusing mechanism and a tilting mechanism.

Description of the Related Art

In recent years, cameras (image pickup apparatuses) have been installed for security purposes in various places such as houses and parking lots. In addition to security applications, camera images are used to preside products in factory lanes. In such various applications, there is a demand for obtaining an image with a deep depth of field. However, the deep depth of field may not be obtained depending on imaging conditions such as a lens performance, an angle of view, and an F-number. For example, an in-focus imaging area may become part in a scene with a depth where a network camera installed on the ceiling is used to capture images of a road, pedestrians, and vehicles.

Accordingly, the Scheimpflug principle is known that adjusts a focal plane by (a tilt control or) tilting or rotating an imaging plane relative to the imaging optical axis plane orthogonal to the imaging optical axis system that captures an object image, and deepens the depth of field of the imaging scene. Japanese Patent Laid-Open No. ("JP") 2010-130633 discloses an image pickup apparatus that acquires its tilt angle, focal length information, and object distance information, calculates a tilt angle of an image sensor without inputting parameters, and makes an automatic tilt control.

However, the image pickup apparatus disclosed in JP 2010-130633 cannot realize an accurate and fast tilt control due to errors in various information such as a tilt angle, stopping accuracy of a focus position, hysteresis variations, and a tilt (slope) of the image pickup apparatus.

SUMMARY OF THE INVENTION

The present invention provides a control apparatus, a control method, and a storage medium, each of which can realize an accurate and fast tilt control.

A control apparatus according to one aspect of the present invention includes a controlling unit configured to control tilt driving for tilting at least one of an image sensor and an imaging optical system relative to a plane orthogonal to an optical axis and focus driving for moving a focus lens in an optical axis direction, an acquiring unit configured to acquire focus levels in a first area and a second area in an image captured by an image pickup apparatus, a first determining unit configured to determine whether to perform the tilt driving or the focus driving, based on an in-focus level, and a second determining unit configured to determine a driving direction of the tilt driving or the focus driving based on the in-focus level. A control method and a storage medium corresponding to the above control apparatus also constitute another aspect of the present invention.

Further features of the present invention will become apparent from the following description of exemplary embodiments with reference to the attached drawings.

BRIEF DESCRIPTION OF THE DRAWINGS

FIG. 5 explains a driver and a driving direction according to this embodiment.

DESCRIPTION OF THE EMBODIMENTS

Referring now to the accompanying drawings, a detailed description will be given of embodiments according to the present invention.

Figure 1:
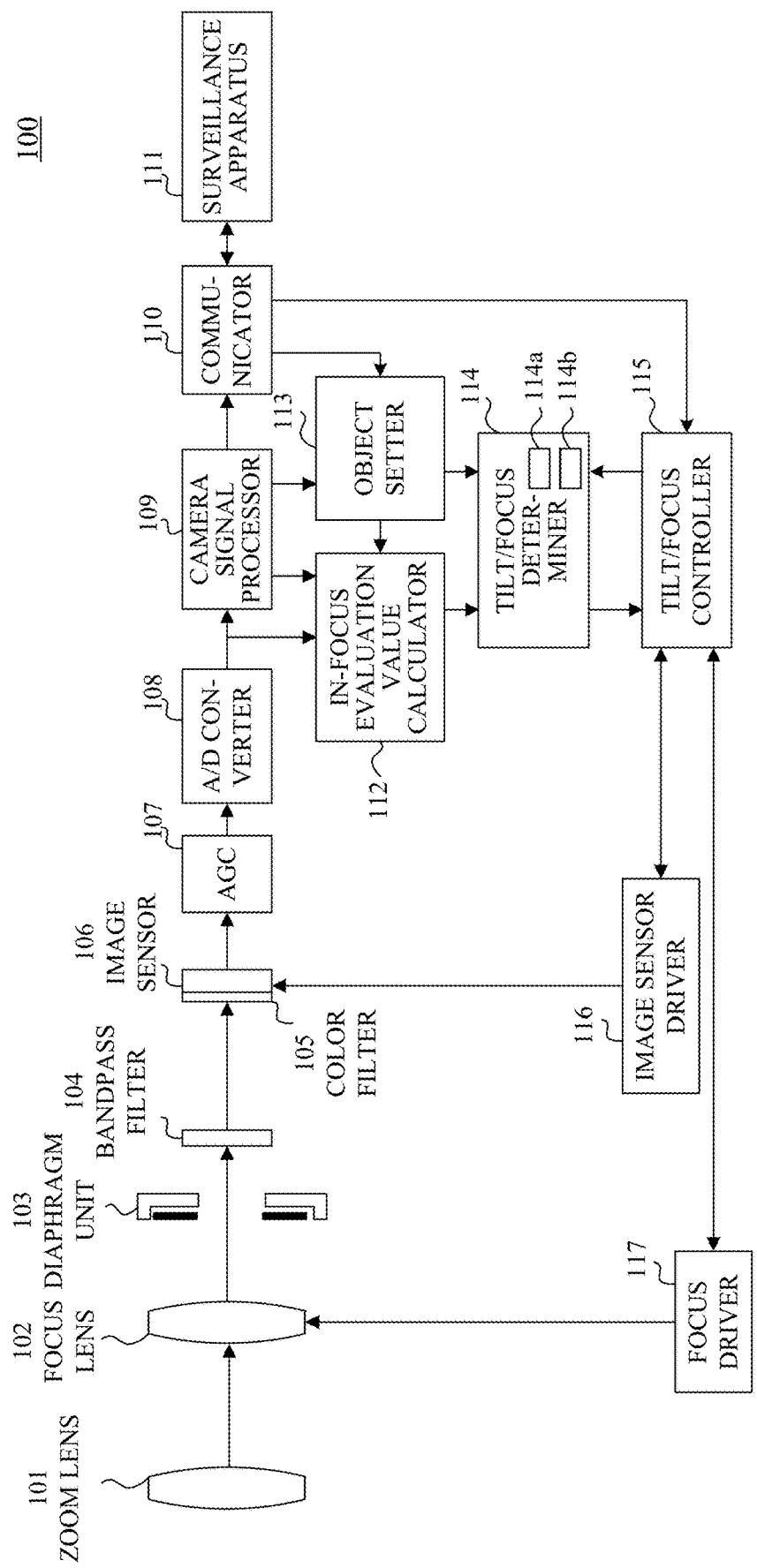
FIG. 1 is a block diagram of an image pickup apparatus according to this embodiment.

Referring now to FIG. 1, a description will be given of a configuration of an image pickup apparatus according to this embodiment. FIG. 1 is a block diagram of an image pickup apparatus 100. In the image pickup apparatus 100 according to this embodiment, an image pickup apparatus body and an imaging optical system (lens apparatus) are integrated with each other. However, the present invention is not limited to this embodiment, and is also applicable to an image pickup system including an image pickup apparatus body and a lens apparatus detachable from the image pickup apparatus body. Then, each unit such as a tilt/focus controlling unit 115 described later may be provided in either the image pickup apparatus body or the lens apparatus.

A zoom lens 101 moves in the optical axis direction and changes the focal length. A focus lens 102 moves in the optical axis direction during focusing. A diaphragm unit (aperture stop unit) 103 adjusts a light amount. The imaging optical system according to this embodiment includes the zoom lens 101, the focus lens 102, and the diaphragm unit 103. However, the present invention is not limited to this embodiment, and is applicable to an imaging optical system that does not include at least one of the zoom lens 101, the focus lens 102, and the aperture unit 103.

The light that has passed through the imaging optical system forms an object image as an optical image on an image sensor 106 via a bandpass filter (BPF) 104 and a color filter 105. The BPF 104 is movable back and forth relative to the optical path of the imaging optical system. The image sensor 106 has a CMOS sensor or the like, and photoelectrically converts the object image formed via the imaging optical system to output an analog electric signal (captured image). An AGC 107 controls a gain of the analog electric signal output from the image sensor 106. An AD converter 108 converts the analog electric signal into a digital signal (digital image pickup signal) and outputs the digital signal to a camera signal processor 109.

The camera signal processor 109 performs various kinds of image processing on the digital imaging signal to generate a video signal. The video signal is output to a surveillance apparatus 111 connected to the image pickup apparatus 100 by wire or wireless communications via a communicator 110. The communicator 110 receives a command (instruction) from an external device and outputs a control signal, such as the command, to the tilt/focus controlling unit (controlling unit) 115.

An in-focus evaluation value calculator (acquiring unit) 112 receives RGB pixel values or luminance values from the AD converter 108 or the camera signal processor 109 for each target object area, and acquires a contrast related evaluation value of a specific frequency (the in-focus evaluation value or the in-focus level). Instead of an evaluation value that is simply based on the specific frequency, it may be divided by a contrast for a normalization. The distance information based on the phase difference or the like may be acquired as the evaluation value. The in-focus evaluation value calculator 112 compares the current in-focus evaluation value with the past in-focus evaluation value, and calculates a change (change amount) of the in-focus evaluation value due to driving of the tilt angle and the focus position.

An object setter 113 detects an object from a captured image based on the signal from the camera signal processor 109. The object setter 113 can determine (detect) a preset object, such as a person or a car, and sets a frame for calculating an in-focus evaluation value. A user designated area may be used as a frame for setting the in-focus evaluation value. The in-focus evaluation value calculator 112 calculates and compares the in-focus evaluation value in the frame set by the object setter 113.

The tilt/focus determining unit 114 includes a first determining unit 114a and a second determining unit 114b, and determines the driver (driving unit) and driving direction to be driven next time based on the change in the evaluation value calculated by the in-focus evaluation value calculator 112 and the past driver and driving direction. The first determining unit 114a determines whether to perform tilt driving (tilt control) or focus driving (focus control), based on the evaluation value (in-focus level). The second determining unit 114b determines a driving direction of the tilt driving or the focus driving based on the evaluation value (in-focus level). The tilt/focus determining unit 114 calculates a tilt angle and a focus position to be driven with the determined driver and driving direction, and notifies the tilt/focus controlling unit 115 of the calculated tilt angle and focus position.

The tilt/focus controlling unit 115 serves as a tilt controlling unit configured to control a tilt angle (tilt driving) and a focus controlling unit configured to control a focus position (focus driving). The tilt/focus controlling unit 115 performs a focus control by autofocus (AF) or manual focus (MF) according to an instruction from the communicator 110. The tilt/focus controlling unit 115 receives the current position from an image sensor driver 116 (an image sensor driving unit) and a focus driver 117 (a focus driving unit), and notifies the tilt/focus determining unit 114 of the current position. The tilt/focus controlling unit 115 instructs a driving position to each of the image sensor driver 116 and the focus driver 117 based on the tilt angle and the focus position calculated by the tilt/focus determining unit 114.

The image sensor driver (tilt driver, a tilt driving unit) 116 tilts the image sensor 106 (performs tilt driving) based on the tilt angle instructed by the tilt/focus controlling unit 115. Normally, the rotation axis that tilts the image sensor 106 is located at the center of the captured image, and the image sensor 106 tilts around the rotation axis. However, the present invention is not limited to this embodiment, and the tilt driver may tilt the imaging optical system instead of the imaging element 106. In other words, the tilt driving is driving for changing a slope of at least one of the image sensor 106 and the imaging optical system. The focus driver 117 controls the position of the focus lens 102 based on the focus set position instructed by the tilt/focus controlling unit 115. In other words, the focus driving is driving for moving in the optical axis direction the focus lens 102, which constitutes at least a part of the imaging optical system.

Figure 2A:
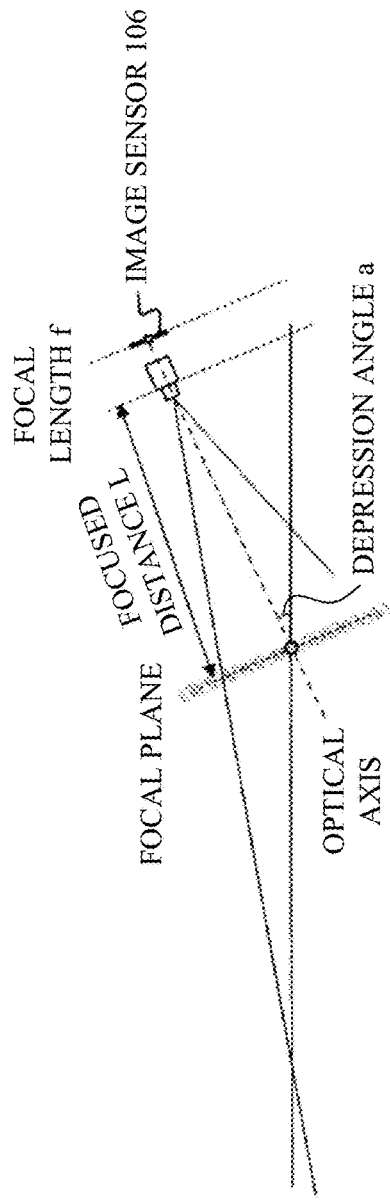
FIGS. 2A to 2C explain a tilt control according to this embodiment.
Figure 2B:
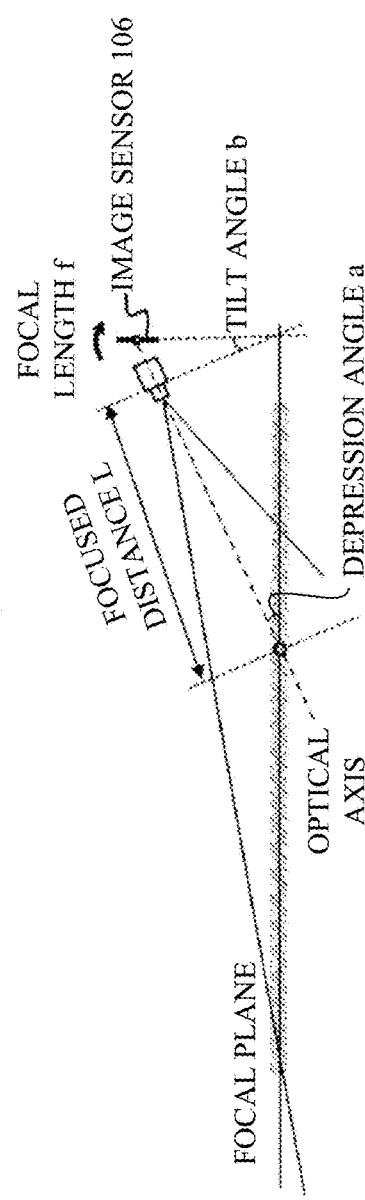
Figure 2C:
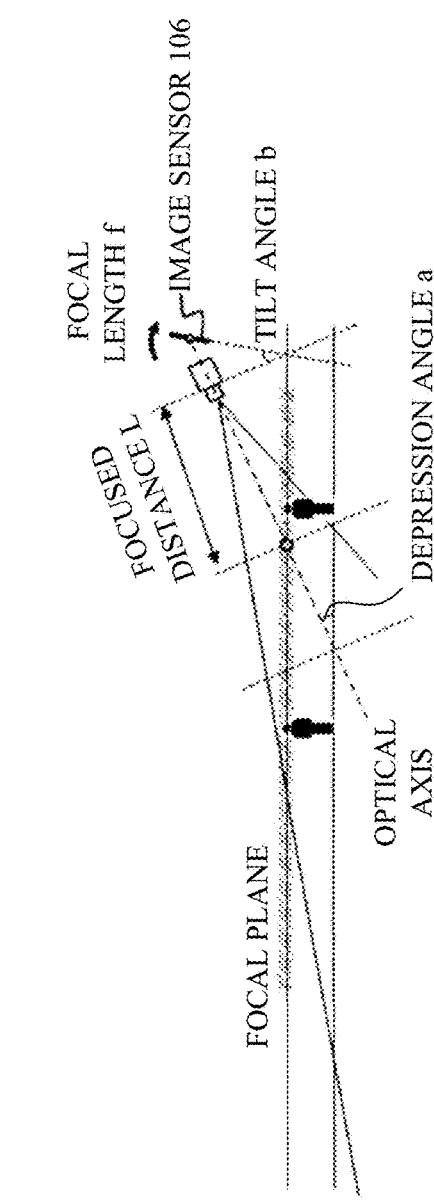

A description will now be given of the tilt control with reference to FIGS. 2A to 2C. FIGS. 2A to 2C explain the tilt control. FIG. 2A illustrates that the principal plane of the optical system (imaging optical system) and the imaging plane of the image sensor 106 are parallel to each other. A focused distance L is in focus, and the focal plane is parallel to each of the optical system and the image sensor 106. FIG. 2B illustrates that the image sensor 106 is rotated around the image sensor rotation axis from the state of FIG. 2A and tilt control is performed. During the tilt control based on the Scheimpflug principle, the focal plane also rotates around the focal plane rotation axis that corresponds to the image sensor rotation axis, and all objects can be focused from a short distance to a long distance with respect to a certain plane. According to the Scheimpflug principle, when the principle plane of the optical system and the imaging plane of the image sensor intersect on one straight line, the focal plane also intersects on the same straight line. The tilt angle b is calculated by the following expression (1) from the Scheimpflug principle using a (lens) focal length f, the focused distance L, and a depression angle α.

$$b=\tan^{-1}(f/(L \tan \alpha)) \quad (1)$$

FIG. 2C illustrates a scene in which an object X (first object area) and an object Y (second object area) are present. Then, as illustrated in FIG. 2C, a control may be made to a focal plane with a height such that the face of the object is in focus. For that purpose, the focus control is necessary as well as the tilt control. The optimum focal plane (or the optimum tilt angle and focus position) differs for each object, and a manual control is difficult for the user.

Figure 3:
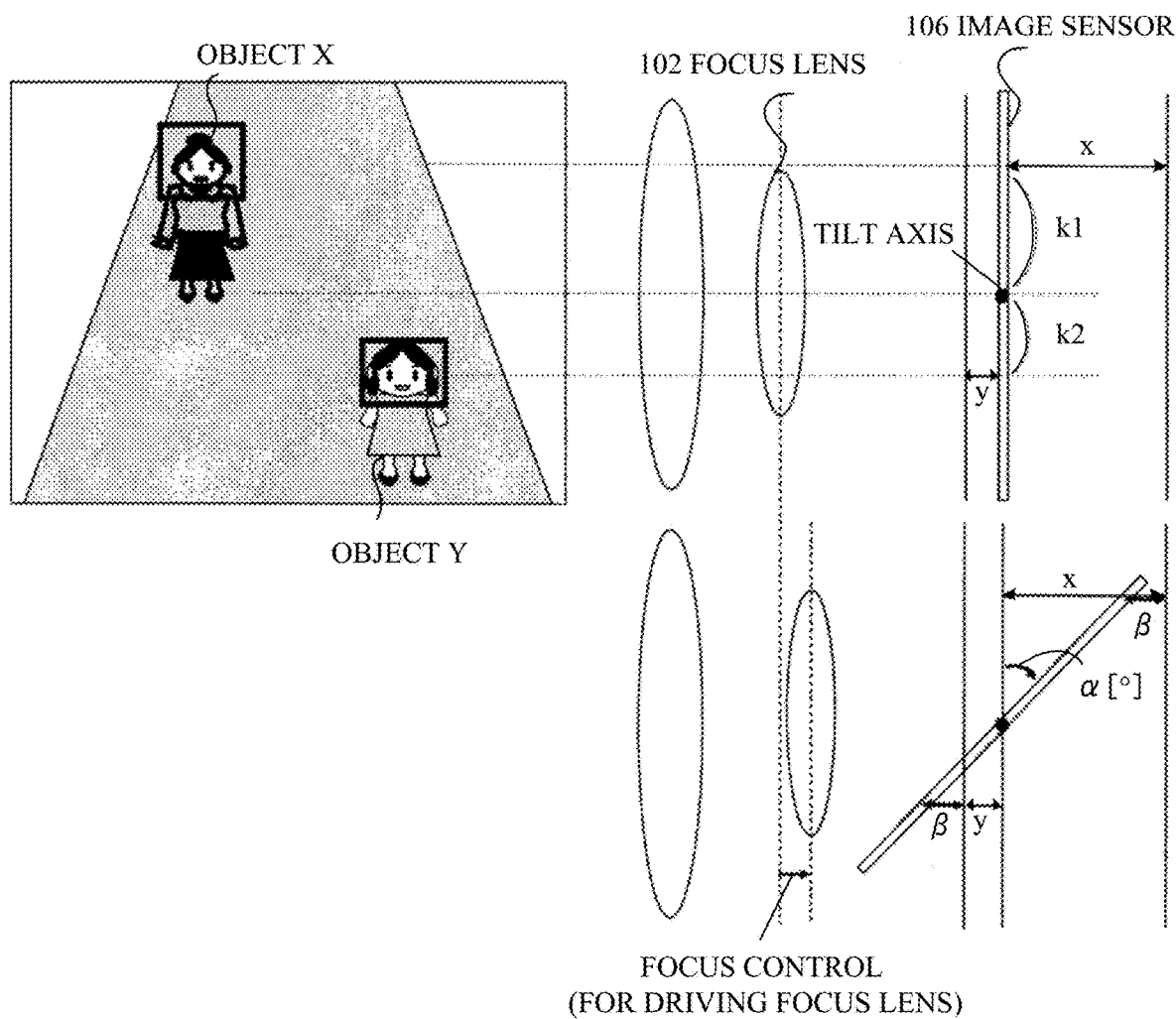
FIG. 3 explains a tilt angle and a focus position according to this embodiment.

Referring now to FIG. 3, a description will be given of an example of calculating the optimum tilt angle and focus position according to the object. FIG. 3 explains the calculations of the tilt angle and the focus position. As target objects, the objects X and Y exist, similar to FIG. 2C. The current tilt angle and the position of the focus lens 102 have a positional relationship as illustrated in upper part of FIG. 3, where x is a correction amount on the focal plane necessary for focusing on the object X, and y is a correction amount on the focus surface necessary for focusing on the object Y. Assume that distances from the tilt axis on the image sensor 106 to the object are k1 [μm] for the object X and k2 [μm] for the object Y. Where α [°] is a tilt angle for simultaneously focus on the objects X and Y and β is a focus correction amount on the focal plane, a relationships of the following expressions (2) and (3) are established.

$$x-\beta=k1 \times \tan \alpha+\beta \quad (2)$$

$$y=k2 \times \tan \alpha-\beta \quad (3)$$

Solving the simultaneous equations (2) and (3) calculates the tilt angle α and the focus correction amount β as represented by the following expression (4) and (5), respectively:

$$\alpha = \tan^{-1}\left(\frac{x+y}{k1+k2}\right) \quad (4)$$

$$\beta = \left(\frac{k2 \times x - k1 \times y}{k1 + k2}\right) \quad (5)$$

The focus control amount can be simply calculated simply by dividing β by the sensitivity of the focus lens 102. Actually, an error occurs due to mechanical factors such as the tilt angle, focus position stopping accuracy, and hysteresis, and factors such as when the object moves. In order to control the optimum tilt angle and focus position even if such an error is present, the tilt/focus controlling unit 115 determines the evaluation value calculated by the in-focus evaluation value calculator 112 and makes a proper control based on the determination.

Figure 4:
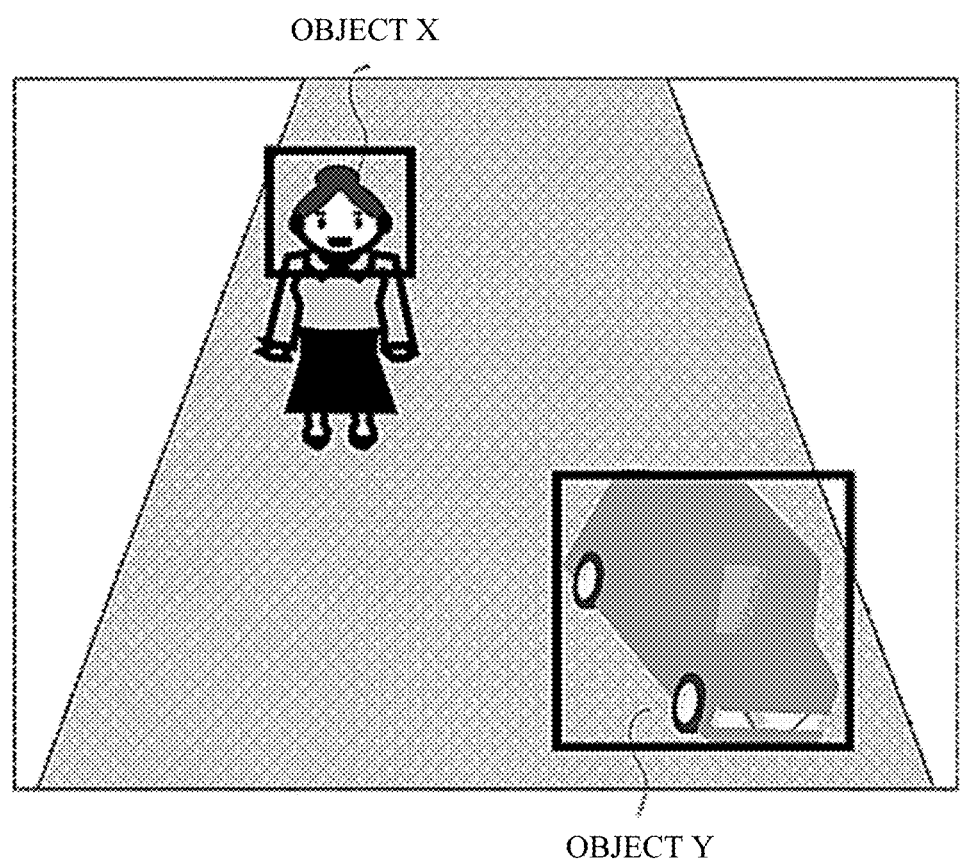
FIG. 4 illustrates a setting example of an evaluation frame according to this embodiment.

FIG. 4 illustrates an evaluation frame setting example according to this embodiment. As illustrated in FIG. 4, when the objects X and Y exist, the tilt/focus controlling unit 115 drives the tilt angle and the focus position (performs tilt driving and focus driving). Then, based on the change in the in-focus evaluation value at that time, the tilt/focus determining unit 114 sets one of the tilt driving or the focus driving to the next driving, and a driving direction of the tilt driving direction or the focus driving direction to the next driving direction. For example, assume that a first area (first object area) is an area (evaluation frame) where the object X is present in the image, and a second area (second object area) is an area (evaluation frame) where the object Y is present. This embodiment is not limited to a case where the object exists only in the first area and the second area, and another object exists in a third area other than the first area and the second area.

Figure 6:
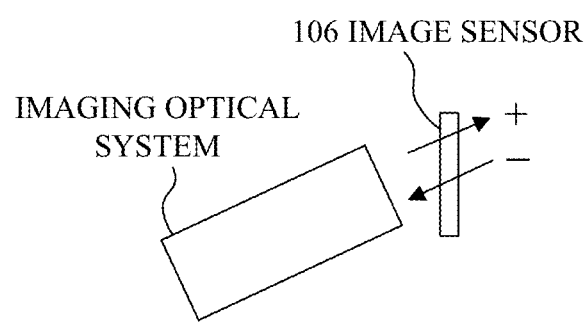
FIG. 6 explains a tilt driving direction according to this embodiment.

FIG. 5 explains the driver and the driving direction according to this embodiment, and shows the driver and the driving direction to be driven next time based on the moved driver and the driving direction and the change of the in-focus evaluation value. For example, when the tilt angle is driven in the + direction and the evaluation values of the object X (first area) and the object Y (second area) both increase, the status means that the tilt angle runs short and the next control drives the same driver in the same direction. In other words, the tilt driver (image sensor driver 116, image sensor 106) is driven in the + direction. When the tilt angle is driven in the + direction, the evaluation value of the object X increases, and the evaluation value of the object Y decreases, the tilt angle is not problematic but rather the focus position is located on the infinity side and thus the next drives a different driver. In other words, the focus driver (focus lens 102, focus driver 117) is driven in the short distance direction. FIG. 6 explains the tilt driving direction, and shows + and − directions of the tilt angle, respectively.

Figure 7:
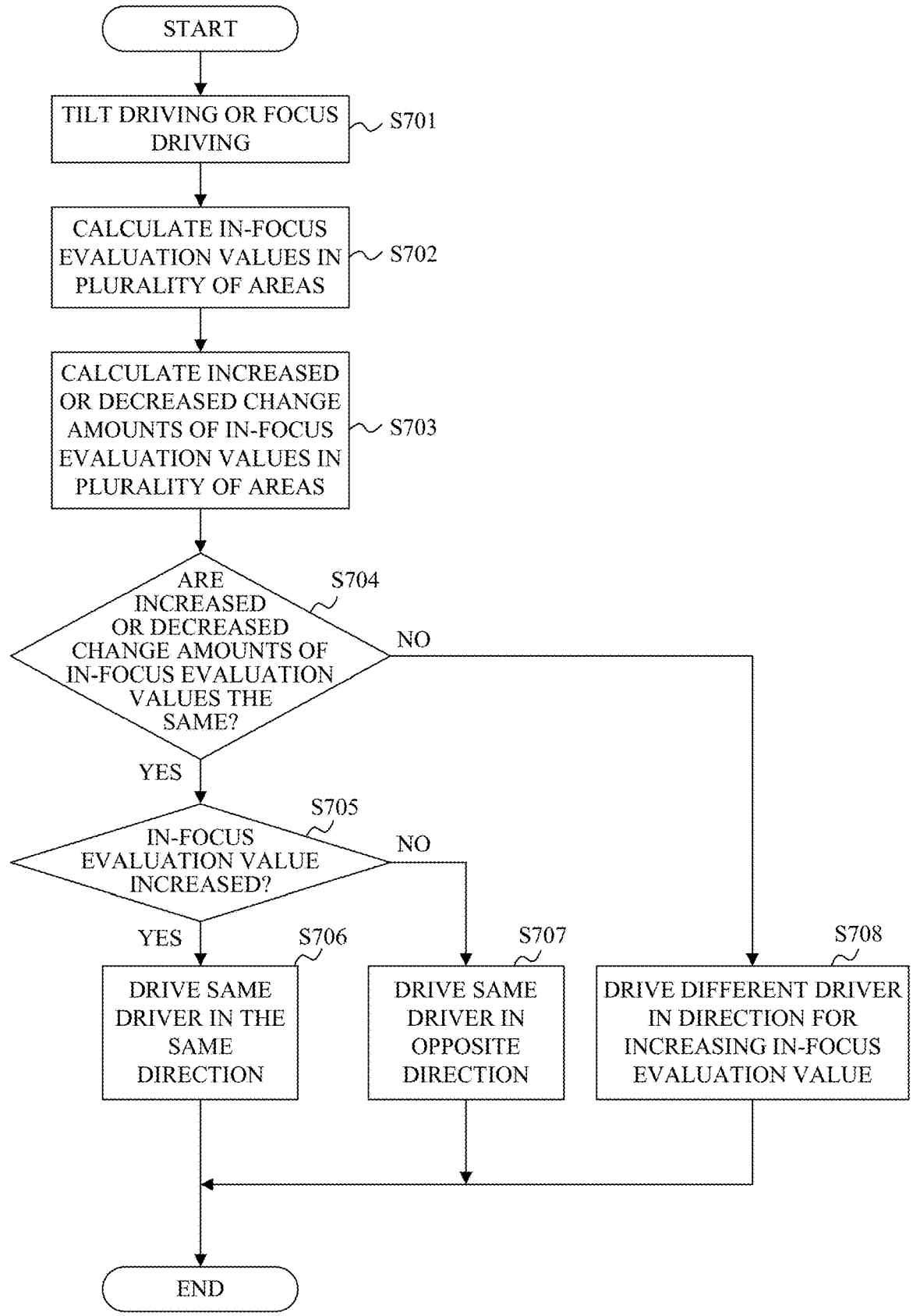
FIG. 7 is a flowchart of a control method according to this embodiment.

Referring now to FIG. 7, a description will be given of the control method according to this embodiment. FIG. 7 is a flowchart showing the control method (main processing) according to this embodiment. Each step in FIG. 7 is mainly executed by the in-focus evaluation value calculator 112, the tilt/focus determining unit 114, or the tilt/focus controlling unit 115.

First, in the step S701, the tilt/focus controlling unit (controlling unit) 115 controls the image sensor driver 116 or the focus driver 117 for the tilt or focus driving in order to perform the optimum tilt control for a plurality of objects. More specifically, the tilt controlling unit performs the tilt driving, and the focus controlling unit performs the focus control. When it is not decided whether to perform the tilt driving or the focus driving, such as when driving starts, the lens can be used for a long time by driving from one having a higher durable number. Next, in the step S702, the in-focus evaluation value calculator 112 calculates the in-focus evaluation value (in-focus level) of each of the plurality of areas (first area and second area). The in-focus evaluation value frame is mainly a face or a moving object, and may be automatically set by detecting an object such as a moving object or may be designated by the user.

Next, in the step S703, the in-focus evaluation value calculator 112 calculates an increased or decreased change amount for each frame based on the change amounts in the in-focus evaluation values of the plurality of areas calculated in the step S702. Next, in the step S704, the in-focus evaluation value calculator 112 determines whether or not the increased or decreased change amounts of the in-focus evaluation values in the plurality of areas are the same. When the increased or decreased amounts of the in-focus evaluation values in the plurality of areas are the same, the flow proceeds to the step S705. In the step S705, the in-focus evaluation value calculator 112 determines whether the in-focus evaluation value has increased. If the in-focus evaluation value has increased, the flow proceeds to the step S706. In the step S706, the tilt/focus determining unit 114 determines to drive the same driver (the image sensor driver 116 or the focus driver 117) in the same direction. Then, the tilt/focus controlling unit 115 drives the same driver in the same direction.

When it is determined in the step S704 that the change amounts of the in-focus evaluation values in a plurality of areas are the same, and when the in-focus evaluation value for each frame has decreased in the step S705, the flow proceeds to the step S707. In the step S707, the tilt/focus determining unit 114 determines to drive the same driver (the image sensor driver 116 or the focus driver 117) in a different direction or in the opposite direction. In other words, the tilt/focus controlling unit 115 drives the same driver in different directions.

When it is determined in the step S704 that the change amounts of the in-focus evaluation values in a plurality of areas are different, the flow proceeds to the step S708. In the step S708, the tilt/focus determining unit 114 determines to drive different drivers in directions in which the in-focus evaluation values in a plurality of areas increase. Then, the tilt/focus controlling unit 115 drives different drivers in the directions in which the in-focus evaluation values increase.

Figure 8:
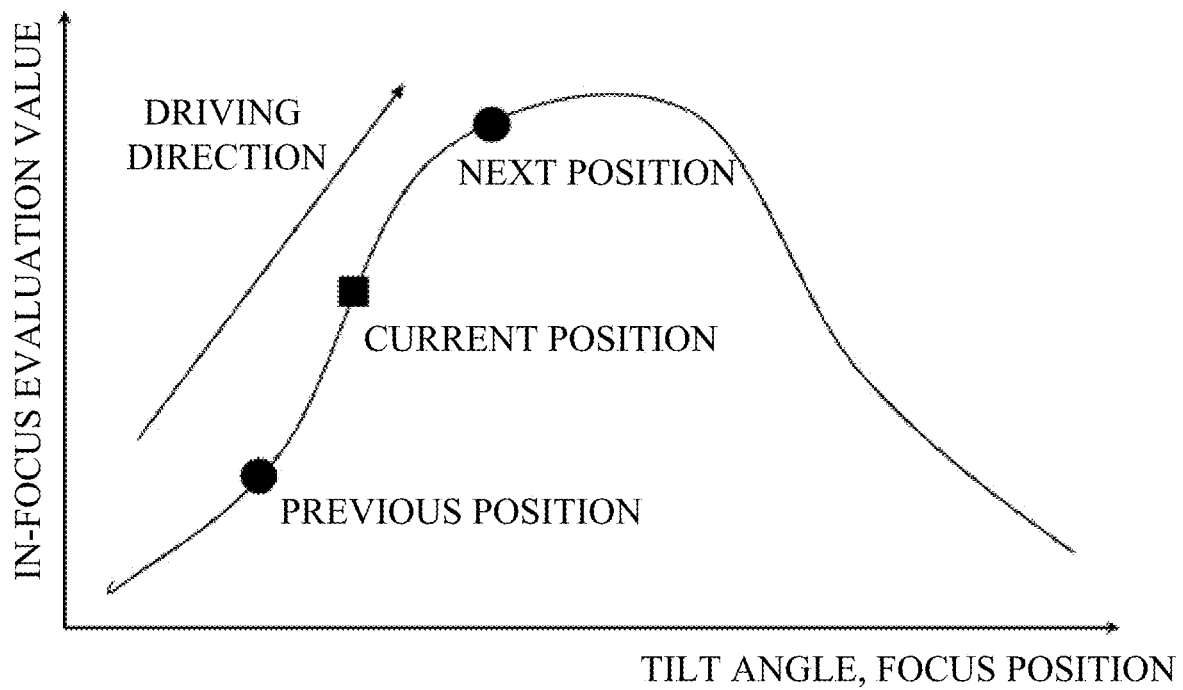
FIG. 8 explains a method for determining whether an in-focus evaluation value has increased or decreased according to this embodiment.

Referring now to FIG. 8, a description will be given of a method for determining whether the in-focus evaluation values in the plurality of areas have increased or decreased. FIG. 8 explains a method for determining whether the in-focus evaluation value has increased or decreased. In FIG. 8, the abscissa axis represents a tilt angle or focus position, and the ordinate axis represents an in-focus evaluation value. In FIG. 8, the previous position indicates the pre-driving tilt angle or focus position, the current position indicates the current tilt angle or focus position, and the next position indicates the tilt angle or focus position after the next driving. The in-focus evaluation value calculator 112 or the tilt/focus determining unit 114 can determine the driving direction by comparing the previous position and the current position with each other and by determining whether the in-focus evaluation value has increased or decreased. As the number of positions used for the determination increases, the determination time also increases, but in order to reduce the influences of noises etc., the determination may be made based on the in-focus evaluation values at each of the previous position, the current position, and the next position.

Alternatively, the determination may be made based on the in-focus evaluation values at the previous position and the next position.

This embodiment determines uses the in-focus evaluation value at the tilt angle or the focus position to determine whether the in-focus evaluation value has increased or decreased, but the present invention is not limited to this embodiment. As described above, the present invention may use the method of determining the tilt/focus driving/driving amount based on the distance information, such as a phase difference, or the method of acquiring the tilt angle, the focal length information, and the object distance information of the image sensor 100 and of providing tilt/focus driving by a fixed amount. Alternatively, fast tilt control and focus control may be performed by first performing approximate tilt driving and approximate focus driving by such a method, and then by performing accurate driving using the method according to this embodiment. The approximate tilt driving and the approximate focus driving can be performed using, for example, a phase difference sensor.

Figure 9:
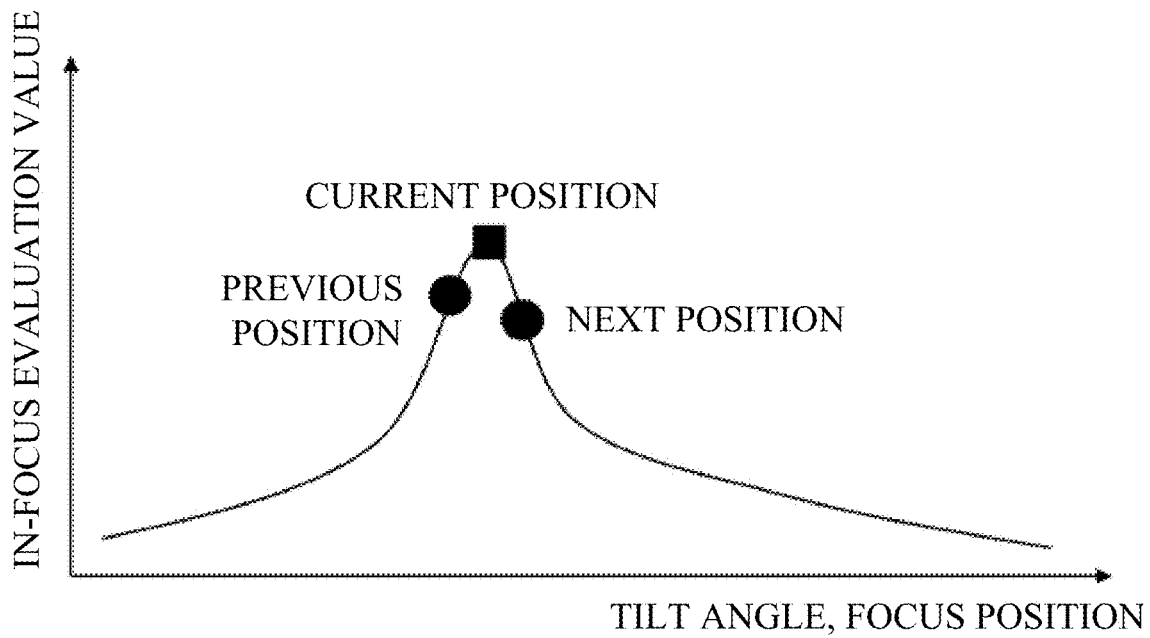
FIG. 9 explains a focusing stop method according to this embodiment.

Referring now to FIGS. 5 and 9, a description will be given of a focusing stop method when the tilt angle and the focus position are optimally controlled. When the driver illustrated in FIG. 5 is driven and both the evaluation values of the objects X and Y decrease, the tilt angle or focus position before driving may become the peak position of the in-focus evaluation value. The peak position becomes the focusing stop position.

FIG. 9 illustrates the focusing stopping method according to this embodiment. In FIG. 9, the abscissa axis represents a tilt angle or the focus position, and the ordinate axis represents an in-focus evaluation value. In FIG. 9, the previous position indicates a tilt angle or focus position before driving, the current position indicates a current tilt angle or focus position, and the next position indicates a tilt angle or focus position after next driving.

The peak position of the in-focus evaluation value corresponds to the current position where the evaluation value decreases at each of the previous position and the next position. When priority is given to accuracy rather than time, after it is confirmed that the in-focus evaluation value decreases at the next position, driving is made in the opposite direction, and the peak position is determined by confirming that the in-focus evaluation value has decreased. This makes it possible to reliably determine the peak position. On the other hand, when priority is given to time until focusing is stopped, rather than the accuracy, the peak position of the in-focus evaluation value is determined when both the evaluation values of the objects X and Y decrease, driving may be adjusted to the peak position, and focusing may be stopped.

This embodiment makes the tilt control by changing the angle of the imaging plane of the image sensor 106, but the present invention is not limited to this embodiment, and may make the tilt control by changing at least part of the angle of the imaging optical system (the principal plane of the optical system). Further, not only the tilt control in the horizontal direction but also the two-axis tilt control with respect to both the horizontal and vertical directions may be employed in the same manner to realize the tilt control while maintaining the recognizability of the object on the two planes.

As described above, according to this embodiment, the control apparatus (image pickup apparatus 100) includes the controlling unit (tilt/focus controlling unit 115), the acquiring unit (in-focus evaluation value calculator 112), the first determining unit 114a, and the second determining unit 114b. The controlling unit controls the tilt driving and the focus driving. The acquiring unit acquires the in-focus level of each of the first area (first object area) and the second area (second object area) in the image. The first determining unit determines whether to perform the tilt driving or the focus driving based on the in-focus level. The second determining unit determines the driving direction of the tilt driving or the focus driving based on the in-focus level.

The acquiring unit may acquire the in-focus level in the third area in the image. The controlling unit may include a tilt controlling unit configured to control the tilt driving, and a focus controlling unit configured to control the focus driving. The acquiring unit may acquire the in-focus levels of at least the first area and the second area before or after the tilt driving or the focus driving (that is, at least one of before and after the tilt driving or the focus driving, and the same applies below). The controlling unit may control the tilt driving or the focus driving based on a change in the in-focus level of each of at least the first area and the second area before or after the tilt driving or the focus driving.

The controlling unit may set one of the tilt driving and the focus driving which is the same as previous driving to next driving, when both in-focus levels of the first area and the second area increase or decrease before or after the tilt driving or the focus driving. On the other hand, the controlling unit may set one of the tilt driving and the focus driving which is different from the previous driving to the next driving, when one of the in-focus levels of the first area and the second area increases and the other decreases (S704 to S708).

The controlling unit may set one of the tilt driving and the focus driving which is the same as previous driving to next driving, when both in-focus levels of the first area and the second area increase before or after the tilt driving or the focus driving, and set a driving direction of the one which is the same as a previous driving direction to a next driving direction (S705, S706).

The controlling unit may set one of the tilt driving and the focus driving which is the same as previous driving to next driving, when both in-focus levels of the first area and the second area decrease before or after the tilt driving or the focus driving, and set a driving direction of the one which is opposite to a previous driving direction to a next driving direction (S705, S707).

The controlling unit may set one of the tilt driving and the focus driving which is different from previous driving to next driving, when one of in-focus levels of the first area and the second area increases and the other of the in-focus levels decreases, and set a driving direction of the one in which the in-focus levels increase to a previous driving direction to a next driving direction (S704, S708).

The controlling unit may determine a focusing stop position when both the in-focus levels of the first area and the second area decrease. The controlling unit may perform one of approximate tilt driving and approximate focus driving based on at least one of the in-focus level or an installation status of the image pickup apparatus. Then, the controlling unit may control a corresponding one of the tilt driving and the focus driving based on the in-focus level after performing the one of the approximate tilt driving and the approximate focus driving. The controlling unit may perform the one of the approximate tilt driving and the approximate focus driving using a phase difference sensor. The installation status of the image sensor may be at least one of an installation angle, a focal length, and an object distance of the image pickup apparatus. The acquiring unit may calculate the in-focus level based on a high frequency component of an object. The controlling unit may select one of the tilt driving and the focus driving, which has a higher driving durable number, during initial driving of a corresponding one of the tilt driving and the focus driving.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment controls the focus position and the tilt angle based on the in-focus levels in a plurality of areas in the image. Therefore, each embodiment can provide a control apparatus, a control method, and a storage medium, each of which can realize an accurate and fast tilt control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156280, filed on Aug. 29, 2019, which is hereby incorporated by reference herein in its entirety.

What is claimed is:

1. A control apparatus comprising:
at least one processor; and
at least one memory coupled to the at least one processor and storing instructions that, when executed by the at least one processor, cause the at least one processor to function as a controlling unit, an acquiring unit, a first determining unit, and a second determining unit,
wherein the controlling unit performs a tilt driving for tilting at least one of an image sensor and an imaging optical system relative to a plane orthogonal to an optical axis and a focus driving for moving a focus lens in an optical axis direction,
the acquiring unit acquires a first evaluation value of a first area and a second evaluation value of a second area in an image captured by an image pickup apparatus,
the first determining unit determines whether to perform the tilt driving or the focus driving, based on changes in the first evaluation value and the second evaluation value, and
the second determining unit determines a driving direction of the tilt driving in a case that the first determining unit determines that the tilt driving is performed, based on the changes in the first evaluation value and the second evaluation value and a driving direction of the focus driving in a case that the first determining unit determines that the focus driving is performed, based on the changes in the first evaluation value and the second evaluation value.

2. The control apparatus according to claim 1, wherein the acquiring unit acquires a third evaluation value in a third area in the image.

3. The control apparatus according to claim 1, wherein the controlling unit includes functions as a tilt controlling unit and a focus controlling unit,
wherein the tilt controlling unit controls the tilt driving, and
the focus controlling unit controls the focus driving.

4. The control apparatus according to claim 1, wherein the acquiring unit acquires the first and second evaluation values of the first area and the second area before or after one of the tilt driving and the focus driving, and
wherein the controlling unit controls the tilt driving or the focus driving based on the change in the first and second evaluation values in at least the first area and the second area before or after the one.

5. The control apparatus according to claim 4, wherein the controlling unit sets one of the tilt driving and the focus driving which is the same as previous driving to next driving, when both the first and second evaluation values of the first area and the second area increase or decrease before or after the tilt driving or the focus driving, and
wherein the controlling unit sets one of the tilt driving and the focus driving which is different from the previous driving to the next driving, when one of the first and second evaluation values of the first area and the second area increases and the other decreases.

6. The control apparatus according to claim 4, wherein the controlling unit sets one of the tilt driving and the focus driving which is the same as previous driving to next driving, when both the first and second evaluation values of the first area and the second area increase before or after the tilt driving or the focus driving, and sets a driving direction of the one which is the same as a previous driving direction to a next driving direction.

7. The control apparatus according to claim 4, wherein the controlling unit sets one of the tilt driving and the focus driving which is the same as previous driving to next driving, when both the first and second evaluation values of the first area and the second area decrease before or after the tilt driving or the focus driving, and sets a driving direction of the one which is opposite to a previous driving direction to a next driving direction.

8. The control apparatus according to claim 4, wherein the controlling unit sets one of the tilt driving and the focus driving which is different from previous driving to next driving, when one of the first and second evaluation values of the first area and the second area increases and the other of the evaluation values decreases, and sets a driving direction of the one in which the evaluation values increase to a previous driving direction to a next driving direction.

9. The control apparatus according to claim 1, wherein the controlling unit determines a focusing stop position when both the first and second evaluation values of the first area and the second area decrease.

10. The control apparatus according to claim 1, wherein the controlling unit performs one of approximate tilt driving and approximate focus driving based on at least one of the first and second evaluation values or an installation status of the image pickup apparatus, and
wherein the controlling unit controls a corresponding one of the tilt driving and the focus driving based on the first and second evaluation values after performing the one of the approximate tilt driving and the approximate focus driving.

11. The control apparatus according to claim 10, wherein the controlling unit performs the one of the approximate tilt driving and the approximate focus driving using a phase difference sensor.

12. The control apparatus according to claim 10, wherein the installation status of the image pickup apparatus includes at least one of an installation angle, a focal length, and an object distance of the image pickup apparatus.

13. The control apparatus according to claim 1, wherein the acquiring unit calculates the first and second evaluation values based on a high frequency component of an object.

14. The control apparatus according to claim 1, wherein the controlling unit selects one of the tilt driving and the focus driving, which has a higher driving durable number, during initial driving of a corresponding one of the tilt driving and the focus driving.

15. A control method configured to control a control apparatus, the control method comprising:
acquiring a first evaluation value of a first area and a second evaluation value of a second area in an image captured by an image pickup apparatus;
determining whether to perform a tilt driving for tilting at least one of an image sensor and an imaging optical system relative to a plane orthogonal to an optical axis or a focus driving for moving a focus lens in an optical axis direction, based on changes in the first evaluation value and the second evaluation value; and
determining a driving direction of the tilt driving in a case that the first determining unit determines that the tilt driving is performed, based on the changes in the first evaluation value and the second evaluation value and a driving direction of the focus driving in a case that the first determining unit determines that the focus driving is performed, based on the changes in the first evaluation value and the second evaluation value; and
controlling the tilt driving and the focus driving.

16. A non-transitory computer-readable storage medium storing a program that causes a computer to execute a control method configured to control a control apparatus, wherein the control method includes:
acquiring a first evaluation value of a first area and a second evaluation value of a second area in an image captured by an image pickup apparatus;
determining whether to perform a tilt driving for tilting at least one of an image sensor and an imaging optical system relative to a plane orthogonal to an optical axis or a focus driving for moving a focus lens in an optical axis direction, based on changes in the first evaluation value and the second evaluation value; and
determining a driving direction of the tilt driving in a case that the first determining unit determines that the tilt driving is performed, based on the changes in the first evaluation value and the second evaluation value and a driving direction of the focus driving in a case that the first determining unit determines that the focus driving is performed, based on the changes in the first evaluation value and the second evaluation value; and
controlling the tilt driving and the focus driving.

17. A control apparatus comprising:
at least one processor; and
at least one memory coupled to the at least one processor and storing instructions that, when executed by the at least one processor, cause the at least one processor to function as a controlling unit, an acquiring unit, and a determining unit,
wherein the controlling unit performs a tilt driving for tilting at least one of an image sensor and an imaging optical system relative to a plane orthogonal to an optical axis and a focus driving for moving a focus lens in an optical axis direction,
the acquiring unit acquires a first evaluation value of a first area and a second evaluation value of a second area in an image captured by an image pickup apparatus,
the determining unit determines whether to change a driving method and a driving direction, based on changes in the first evaluation value and the second evaluation value, wherein the driving method is the tilt driving or the focus driving.

* * * * *